(12) United States Patent
Kleiner et al.

(10) Patent No.: US 9,307,203 B2
(45) Date of Patent: Apr. 5, 2016

(54) METHOD AND DEVICE FOR CONTROLLING A CONFERENCE

(71) Applicant: Unify GmbH & Co. KG, Munich (DE)

(72) Inventors: Patrick Kleiner, Munich (DE); Karl Klug, Miesbach (DE); Martha Unterstaller, Munich (DE); Luzia Stephan, Bergkirchen (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 14/662,454

(22) Filed: Mar. 19, 2015

(65) Prior Publication Data
US 2015/0271448 A1 Sep. 24, 2015

(30) Foreign Application Priority Data

Mar. 20, 2014 (DE) .......................... 10 2014 004 069

(51) Int. Cl.
*H04N 7/15* (2006.01)

(52) U.S. Cl.
CPC . *H04N 7/157* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 5,657,096 A | 8/1997 | Lukacs | |
| 5,737,011 A | 4/1998 | Lukacs | |
| 5,896,128 A | 4/1999 | Boyer | |
| 5,991,385 A | 11/1999 | Dunn et al. | |
| 8,072,481 B1 | 12/2011 | McNelley et al. | |
| 8,085,920 B1 | 12/2011 | Bedingfield, Sr. et al. | |
| 8,760,485 B2* | 6/2014 | Dunn | H04N 7/152 348/14.01 |
| 2009/0033737 A1 | 2/2009 | Goose et al. | |
| 2009/0079816 A1* | 3/2009 | Qvarfordt | G06K 9/00335 348/14.16 |
| 2009/0213206 A1* | 8/2009 | Niu | H04N 7/147 348/14.09 |
| 2011/0113351 A1* | 5/2011 | Phillips | G06Q 10/10 715/757 |
| 2012/0002001 A1 | 1/2012 | Prentice | |
| 2012/0197991 A1* | 8/2012 | Ramani | H04N 7/15 709/204 |
| 2012/0306992 A1 | 12/2012 | Watson et al. | |
| 2013/0076853 A1 | 3/2013 | Diao | |

FOREIGN PATENT DOCUMENTS

| | | |
|---|---|---|
| EP | 1315071 A1 | 5/2003 |
| EP | 2385701 A1 | 11/2011 |
| WO | 2004109633 A2 | 12/2004 |
| WO | 2012141707 A1 | 10/2012 |
| WO | 2013142641 A1 | 9/2013 |

* cited by examiner

*Primary Examiner* — Joseph J Nguyen
(74) *Attorney, Agent, or Firm* — Buchanan Ingersoll & Rooney PC

(57) ABSTRACT

A method and communication system are disclosed for conducting a conference among sets of conference participants connected by a communication system. This system has at least one conference server, at least one image reproduction unit at each conference environment and at least one microphone at each conference environment. The method involves calculating respective virtual images of a majority of the conference environments, each virtual image containing at least one image corresponding to at least one conference participant who is present at that conference environment, calculating an aggregate representation of the virtual images of all conference environments and displaying the aggregate representation on at least one image reproduction unit. The method also calculates an individual representation for an individual conference participant and provides the individual participant with the individual representation while simultaneously providing to that individual the aggregate representation.

13 Claims, 10 Drawing Sheets

METHOD AND DEVICE FOR CONTROLLING A CONFERENCE

FIELD OF INVENTION

The invention relates to a method, a software product and a device for controlling a conference, especially a virtual conference.

BACKGROUND OF THE INVENTION

Often times, conferences are being held as video conferences. The conference participants can participate in the conference from anywhere in the world. As an example, some of the dialog partners are sitting together in a room and others are sitting alone at work or in their home office. In a real conference where all participants are sitting together in a room, each participant is able to individually turn to individual participants and draw more precise conclusions, for example, from their facial expressions and reactions, behavior, and emotions and to adjust their own behavior accordingly. In a video conference, all participants have the same view which is an aggregate view of all participants and is created by the conference server. Settings of individual participants (for example, camera orientation, zoom) influence the representation for all participants. It is not possible to individually observe individual participants.

It is known that the representation of a video conference can be manipulated such that a camera from a far side of the conference can be controlled on a case-by-case basis. However, this has implications for all conference participants and also does not create an individual view, but influences the aggregate view only. In addition, constantly readjusting the camera(s) can create a certain anxiety during the conference that is not desirable.

SUMMARY OF THE INVENTION

One problem addressed by the present invention is to provide a method and a device for controlling communication during conferences with the method and the device being able to at least partially overcome the previously mentioned drawbacks of the prior art. In particular, one problem addressed by the present invention is to provide a method and a device for controlling communication during conferences with the method and the device being able to improve the individual observation possibilities of a conference participant and to provide him preferably with a private view of individual or selected participants.

According to the present method, the problem is solved at least in partial aspects by the features of the independent claims. Advantageous embodiments and developments of the invention are provided in the dependent claims.

According to one aspect of the method, a method for controlling a virtual conference is being proposed and the method consists of the following steps:

a) Calculating respective virtual images of a plurality of conference environments which include one or several participant(s) and which are connected with the aid of communication technology;

b) Calculating an aggregate representation, which is adjusted to one of the respective conference environments, with the aid of the virtual images of all conference environments;

c) Providing all participants of the respective conference environment with the aggregate representation;

d) Calculating an individual representation that is adjusted to an individual participant, with the aid of the aggregate representation of the respective conference environment which the individual participant is part of, and e) Providing the individual participant with the individual representation while simultaneously providing the aggregate representation according to step c).

In the following description, a virtual conference is a communication event between several, preferably more than two participants by means of exchanging audio and video data where the exchange of data occurs through electronic means of communication, preferably via a packet-based protocol such as TCP/IP or similar. In doing so, the video information of each conference environment is typically being recorded via one or several cameras and the audio information of each conference environment is typically being recorded via one or several microphones. In case the video information cannot be provided, for example, because the respective conference environment is a mobile phone or a similar device or because no camera is available due to other reasons, the respective participant can be rendered as an avatar, replacement image, still image or symbol in the aggregate representation. In the following disclosure, a virtual image refers to a visual and/or auditory, preferably audiovisual, particularly spacial representation of a conference environment from the respective video and/or audio information. Ideally, but not necessarily, at least one camera and one microphone is assigned to each participant within a conference environment; as a result, for each participant, there is individual video and audio information which allows for a separation of the participants when the virtual image is being created. Alternatively, a virtual image with realistic spacial mapping of the participants can be created for example with the aid of a camera and/or microphone arrangement installed at a fixed location and a suitable means of image recognition. An aggregate representation is a virtual arrangement of all (recognized) participants of all conference environments in a virtual conference room. The aggregate representation is adjusted to the respective conference environment, i.e., the arrangement of the conference participants in the respective virtual conference room is adjusted to the conditions of the actual conference environment. For example, the participant(s) of the respective conference environment can be positioned in the center of the virtual conference room (the aggregate representation) in accordance to their actual distribution, while the participants of other conference environments are positioned around them. Depending on the reproduction possibilities of the respective conference environment, the arrangement of the participants in the respective virtual conference room pertains to the visual as well as the auditory or acoustic space, so that a virtual reality can—again, depending on the reproduction possibilities of the respective conference environment—be created for the participants that is without contradiction with respect to visual and auditory sensations. The provision of the aggregate representation includes transferring the audio-visual data which corresponds to the aggregate representation to a local conferencing unit of the respective conference environment. For example, the aggregate representation can be reproduced on an appropriate surface on an individual terminal device of each participant, or it can be rendered on the fixed-installed screen or projection system of the respective conference environment which is visible to all participants present. The individual representation can also be an aggregate representation; however, it is, according to step d) of the inventive method, adjusted to an individual participant. In other words, the individual representation generally differs from the aggregate representation. The individual representation can be calculated on request of the individual participant or due to previously known preferences of the individual participant.

In other words, the present method creates virtual spaces on three levels: A first level consists of the virtual images of each conference environment as a conversion (as realistic as possible) of the actual conditions to computing space; a second level combines all of the connected conference environments and creates for each conference environment a virtual space of all participants of all conference environments, where the virtual room is common to all participants of the respective conference environment (less the participants of the respective conference environment for which the aggregate representation is being created, if applicable); and a third level enables the creation of an individual virtual space for each participant, where the representations of the second and third levels are provided to the participants simultaneously (the third level only to the individual participant for whom it is created). The virtual images, aggregate representations and individual representations, in other words, the virtual spaces, should first of all be understood as data constructs that become perceptible by means of reproduction with the aid of an appropriate device, but exist within a data space even without a reproduction device. Using the singular in relation to the respective conference environment, the aggregate representation, the individual participant, and the individual representation also always includes the application to several respective conference environments and the creation of several corresponding aggregate representations as well as to several individual participants of a conference environment and the creation of several corresponding individual representations. The inventive method creates a new virtual overall view of a conference that builds on the possibilities of a real conference where all participants are sitting in the same room. The individual observation possibilities of a conference participant are being improved and the participant receives a private view of individual or select participants. The conferencing unit or the conference server thus controls not only the common view of the conference regarding video and/or audio, but also provides a unique logical unit for each participant/conference room. This individual logical unit can be controlled individually: zooming, choosing persons, etc. Each conference participant receives a private view of a virtual conference room.

Steps a) through e) of the present method can be performed by a central conferencing unit, in particular a conference server. The central conferencing unit can also be realized by a local conferencing unit of one of the conference environments which will also undertake control tasks for the other conference environments.

Alternatively, steps b) through e) can be performed by a local conferencing unit, which is assigned to the respective conference environment, wherein step b) may be preceded by a step of receiving the virtual images of all other conference environments. For example, the virtual images can be provided by a central conference server, or they can be received directly from the individual (other) local conferencing units.

Another alternative is to have steps d) and e) performed by a local conferencing unit that is assigned to the respective conference environment, wherein step d) may be preceded by a step of receiving the aggregate representation for the respective conferencing unit. For example, the aggregate representations can thereby be provided by a central conference server.

Step d) can be preceded by a step of receiving and/or processing of individual requirements of the respective participant. For example, the individual requirements can include pre-settings or a real-time selection of the respective participant, whereas in step d) of the calculation of the individual representation the individual requirements of the respective participant are applied. In particular, the requirements can include at least one from the group, which has:

The spacial arrangement of the participants;
Removing, adding, resizing one or more participants and/or objects;
Placing one or more participants in a separate representation (e.g. window);
The representation of metadata or additional information, such as context data, moods, personal and/or professional relationship data, private contact details for one or more participants;
Emphasizing or attenuating a listening level for individual sources, e.g. participants; Metadata and context data on shown participants can be automatically determined by a service.

In one embodiment, the requirements of the individual participant can be communicated via voice input. This embodiment provides handling advantages for the mobile participant. It is also possible to provide the individual representation on a mobile terminal device.

In one preferred embodiment, the aggregate representations provide for an even visual and/or acoustic distribution of the participants in a virtual space. This provides for optimal mapping and positioning of the participant while conserving resources. Naturally, the uniform distribution is limited by the reproduction possibilities with respect to each conference environment. Thus, a visual representation cannot be reproduced by a simple mobile phone and an acoustic representation via a simple loudspeaker is limited to the signal sum. Nevertheless, at the request of the mobile phone user, the audio signal of individual participants can be emphasized or attenuated, and adequate means of filtering can increase the clarity and transparency in the aggregate representation, for example. If the participant with the mobile terminal device uses a headset, appropriate methods such as spatial audio can be used to convey a spatial impression. Therefore, the inventive method is also particularly usable and beneficial within an audio-only-mode. When using a surround sound system in a room, not only the width but also the depth of the virtual space can be directly utilized.

It should be understood that the invention can also be represented by a computer program, comprising program commands which cause the computer to perform the procedural steps of the described method when the computer program is installed on the computer or run from the computer, a software product that is stored on a computer-readable medium and that preferably can be loaded directly into the internal storage of the computer and that includes program codes for performing the procedural steps of the described method when the computer program is run on the computer, and a digital storage medium with electrically readable control signals that can work with a programmable computer in order to administer communication processes wherein the control signals are designed and adjusted to cause the computer to run the procedural steps of the described method. The computer can be represented by a conferencing system, a conference server, a conference terminal device, an individual terminal device of a participant or similar equipment.

According to an additional aspect of the invention, a device that can carry out the method is being proposed, wherein the method is designed according to the above description. The problem addressed by the present invention is solved by these devices for the same reasons as the ones stated above for the corresponding method. For example, the device can consist of or include a conference server or central conferencing unit or a peripheral device or terminal device, i.e. an arrangement of such devices for the distributed execution of the method. The term "to execute" is to be understood in a way that the device is conceptualized, designed, adapted, configured, programmed and/or similar accordingly.

Additional features, tasks, advantages and details of the present invention will become more apparent from the following description of exemplary embodiments and their representation in drawings in the included Figures. It is understood that features, tasks, advantages and details of individual examplary embodiments are transferable to other exemplary embodiments and are considered to be disclosed also in connection with the other exemplary embodiments unless this is obviously inapplicable for technical or physical reasons. Exemplary embodiments can be combined with other exemplary embodiments and that combination can also be considered an exemplary embodiment of the invention.

The method is described below in more detail based on preferred exemplary embodiments and with reference to the Figures.

The Figures are schematic illustrations and not necessarily according to scale. The graphic representations and their descriptions are intended to illustrate the principle of the invention and shall in no way restrict the invention.

DESCRIPTION OF THE PREFERRED EMBODIMENTS

Figure 1:
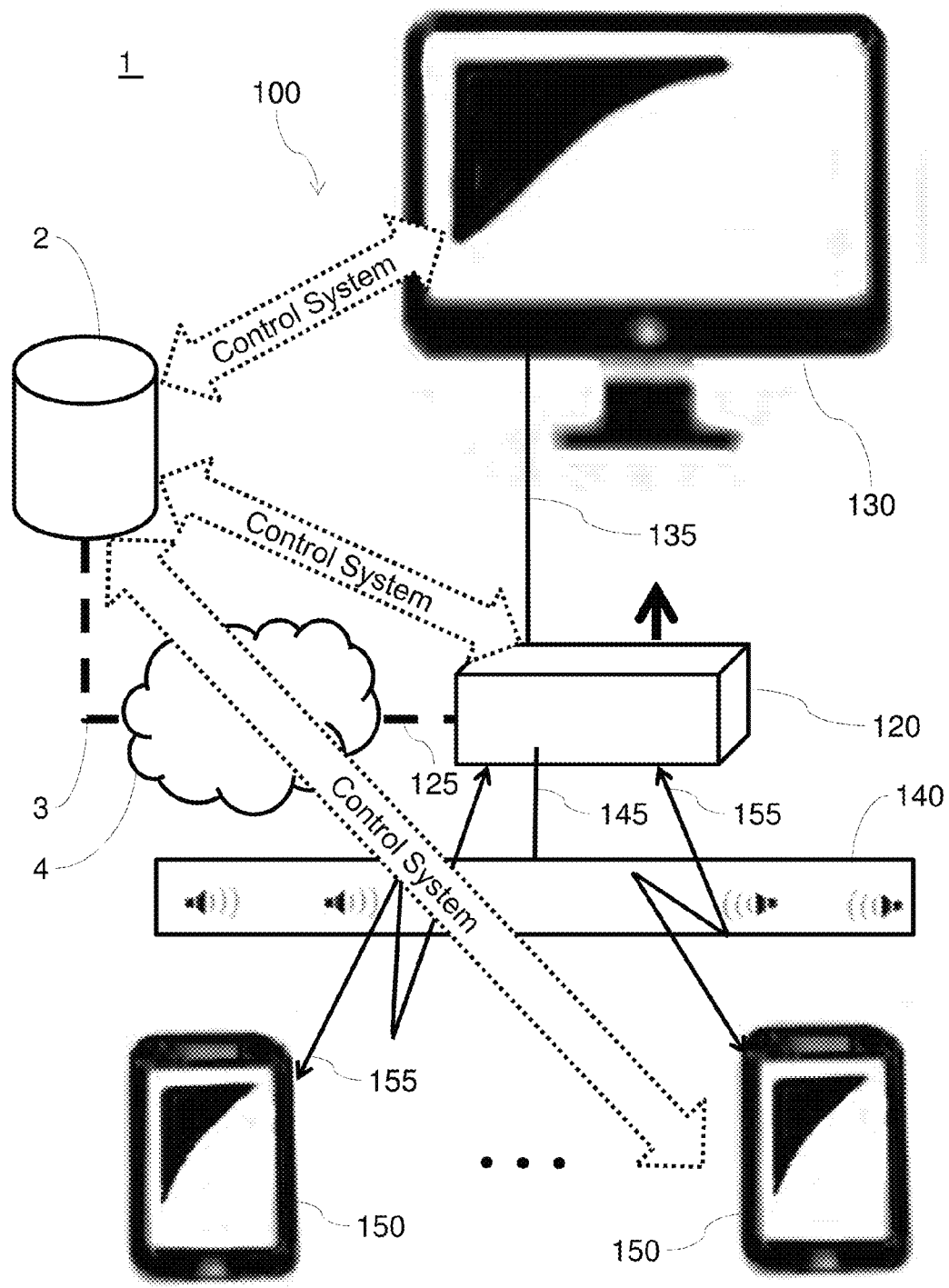
FIG. 1 is a representation of a conferencing system according to one exemplary embodiment of the present invention.

FIG. 1 shows a representation of a conferencing system 1 in form of a block diagram. Conferencing system 1 includes a conference server 2, which is connected to an intranet 4 via a network connection 3. The conference server conference server contains a processor and a non-transitory memory containing a program which enables the conference server to preform the steps required to conduct the conference. Conference server 2 includes services such as a backend service for controlling conference environments. FIG. 1 shows an example of a conference environment 100. Conference environment 100 corresponds to a situation in a conference room.

Conference environment 100 comprises a local conferencing unit 120, which is connected to Intranet 4 via a network connection 125. An image reproduction unit 130 is connected via connection 135 to conferencing unit 120. A sound reproduction unit 140 is connected via connection 145 to conferencing unit 120. The conference unit contains a processor and a non-transitory memory containing a program which enables the conference server to preform at least some of the steps involved in conducting the conference. Several terminal devices 150, each assigned to one participant (not shown in detail here) within conference environment 100 are connected to conferencing unit 120 via connections 155. In this example, connections 135 and 145 of the image and sound reproduction units 130, 140 are wire connections, whereas the connections 155 of the terminal devices 150 are wireless connections. In particular, terminal devices 150 are mobile terminal devices, which can be the terminal devices of the participants. Connections 135, 145, 155 can be comprised of network connections that form a separate network of conference environment 100 or may be part of Intranet 4. On the other hand, connections 155 of terminal devices 150 can be mobile connections such as GSM, UMTS, or similar or short range radio connections such as Bluetooth or similar. The invention is not limited to the type of connection of image and sound reproduction systems 130, 140 and terminal device 150. As shown in FIG. 1, conference server 2 is configured to provide control access to local conferencing unit 120, image reproduction unit 130 and terminal devices 150.

Figure 2:
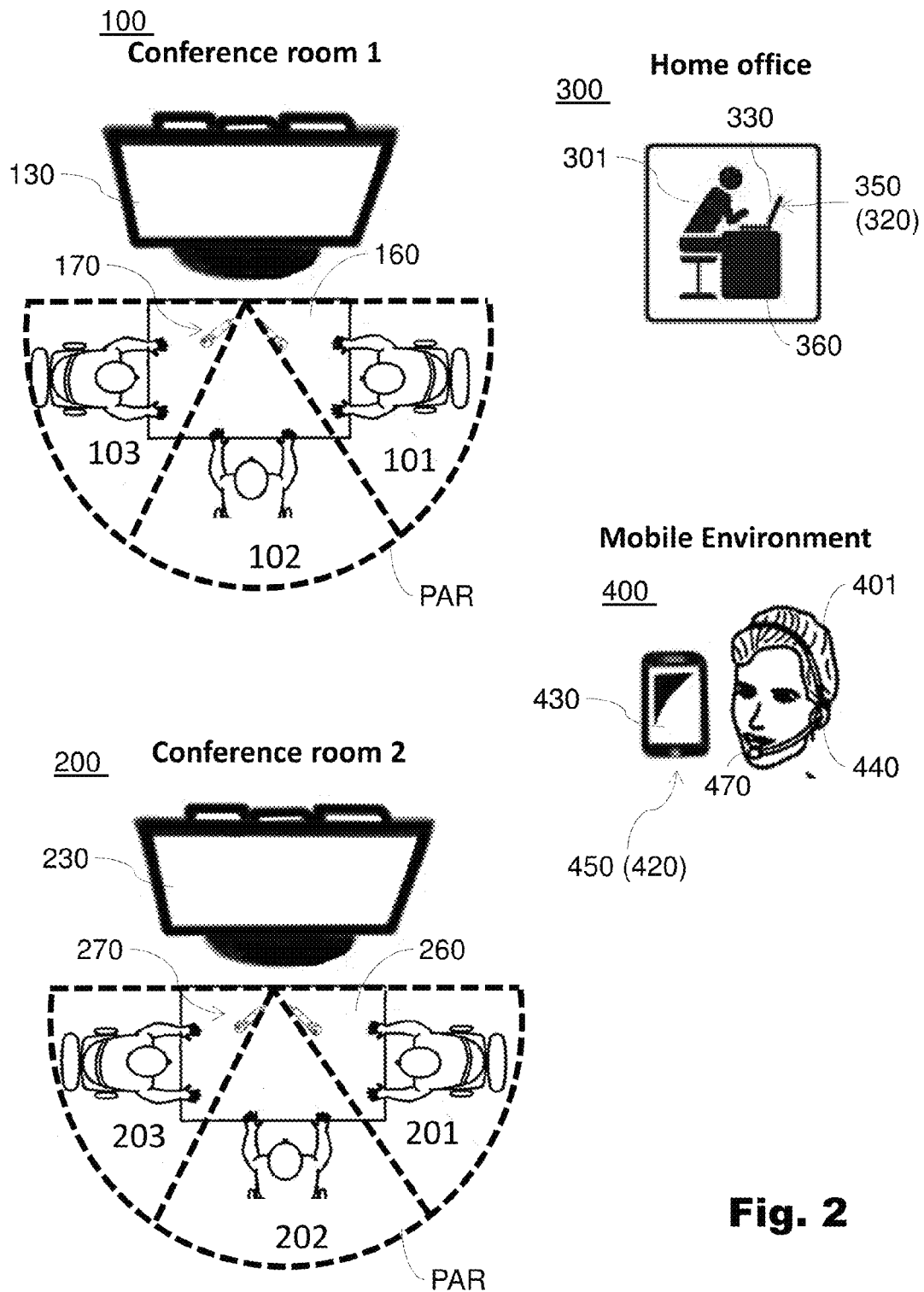
FIG. 2 is a representation of several conference environments in the conferencing system of FIG. 1.

It should be understood that conference system 1 may have more conference environments than the exemplified conference environment 100 in FIG. 1. FIG. 2 shows examples of configurations of a first conference room 100, a second conference room 200, a home office 300 and a mobile environment 400 as conference environments of conference system 1.

As shown in FIG. 2, conference environment 100 (first conference room or conference room 1) not only features the devices shown in FIG. 1 (FIG. 2 shows image reproduction unit 130 as an example of these devices), but also a conference table 160 with a microphone arrangement 170 positioned on top. Microphone arrangement 170 includes an example of two individual microphones, which are arranged at an angle such that a physical acoustic space PAR is acoustically covered in the area of conference table 160. Three participants 101, 102, 103 are—about equally distributed—sitting around conference table 160. In this way, participants 101, 102, 103 can easily be located spatially via microphone arrangement 170 and assigned to roughly equal-sized segments of the physical acoustic space PAR. Terminal devices of participants 101, 102, 103 are not further illustrated.

Figure 6:
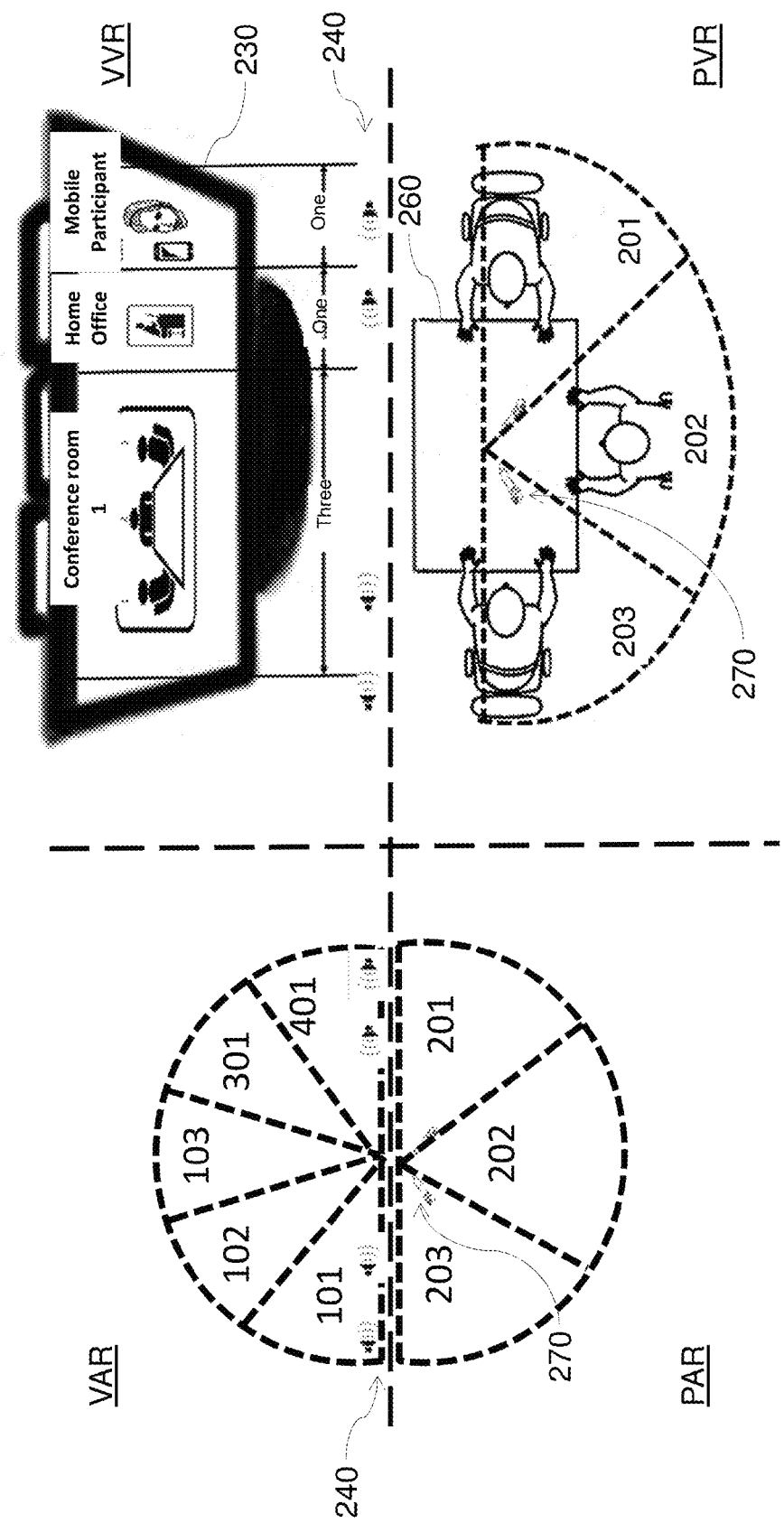
Figure 7:
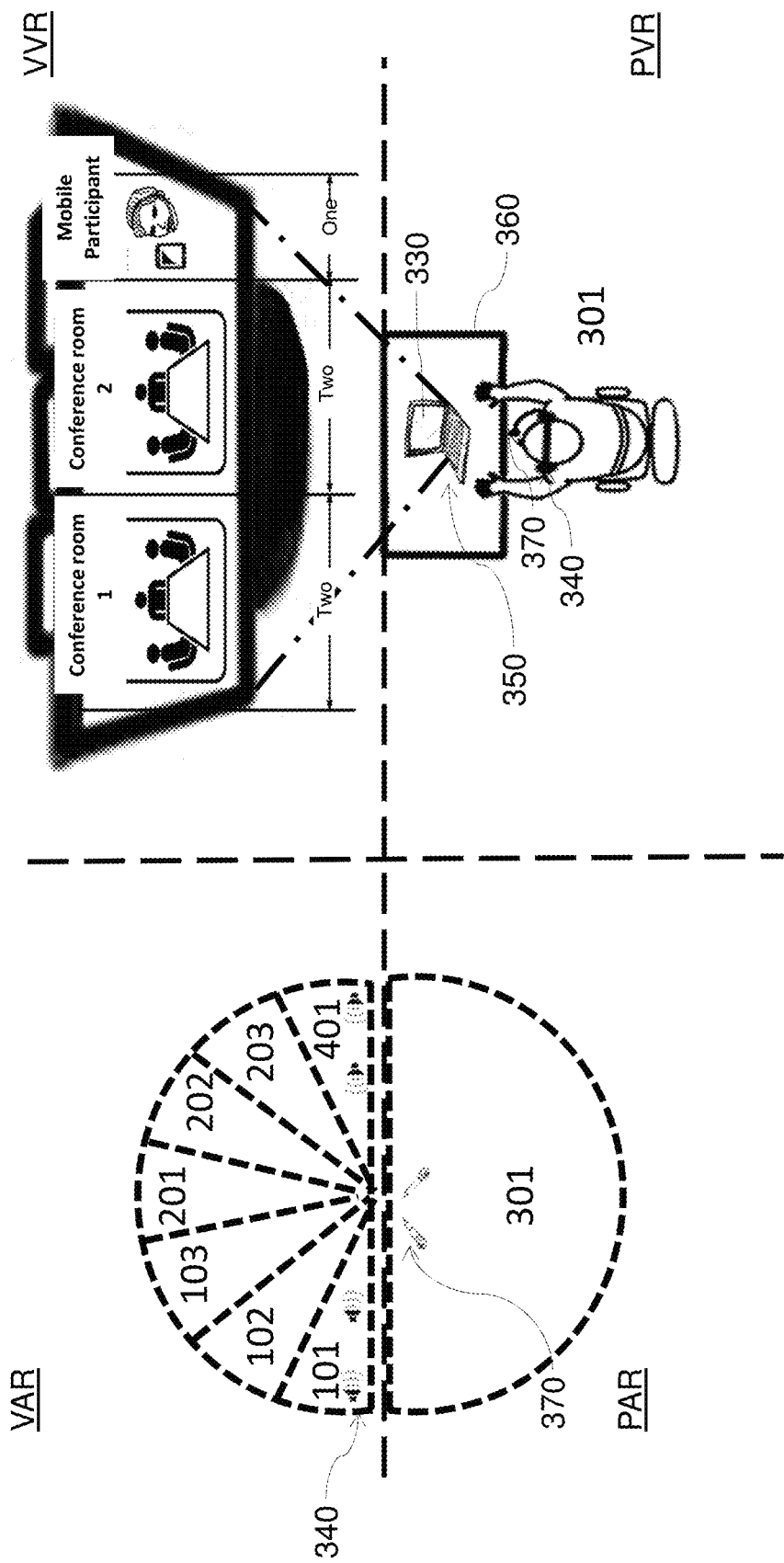

Similarly, conference environment 200 (second conference room or conference room 2) next to an image reproduction unit 230 features a conference table 260 with a microphone arrangement 270 positioned on top. The microphone arrangement 270 includes an example of two individual microphones, which are arranged at an angle such that a physical acoustic space PAR is acoustically covered in the area of the conference table 260. Three participants 201, 202, 203 are—about equally distributed—sitting around the conference table 160. In this way, participants 201, 202, 203 can easily be located spacially via the microphone arrangement 270 and assigned to roughly equal-sized segments of the physical acoustic space PAR. While FIG. 2 is not illustrated in detail, the second conference room 200 shows a similar configuration as the first conference room 100 according to FIG. 1 and it also has a local conferencing unit, a sound reproduction unit (240; see FIG. 6) and terminal devices of participants 201, 202, 203.

Conference environment 300 is a home office that is assigned to a single participant (homeworker) 301. The home office 300 includes a conference table 360 with a terminal device (here, a laptop computer) 350. Again, terminal device 350 serves as a local conferencing unit 320 or features a corresponding service Terminal device 350 features a monitor which also serves as image reproduction unit 330 for conference environment 300. Naturally, a peripheral monitor unit or projector unit (projector) or a similar device connected to terminal device 350 can also be provided as image reproduction unit of conference environment 300. While not illustrated in detail in the Figures, terminal device 350 can be connected to a headset that features a single microphone to serve as the microphone arrangement (370, see FIG. 8) and two earcups to serve as the sound reproduction unit (340, see FIG. 8).

Conference environment 400 is a mobile environment, which is assigned to a single participant (mobile participant) 401 who is carrying a terminal device 450 in the form of a smartphone. Again, terminal device 450 serves as a local conferencing unit 420 or features a corresponding service. Terminal device 450 features a screen which also serves as the image reproduction unit 430 for conference environment 400. A headset connected to terminal device 450 via a cable connection or a wireless connection such as Bluetooth, infrared interface or similar features a single microphone serving as an microphone arrangement 470 and two earcups serving as the sound reproduction unit 440.

Figure 3:
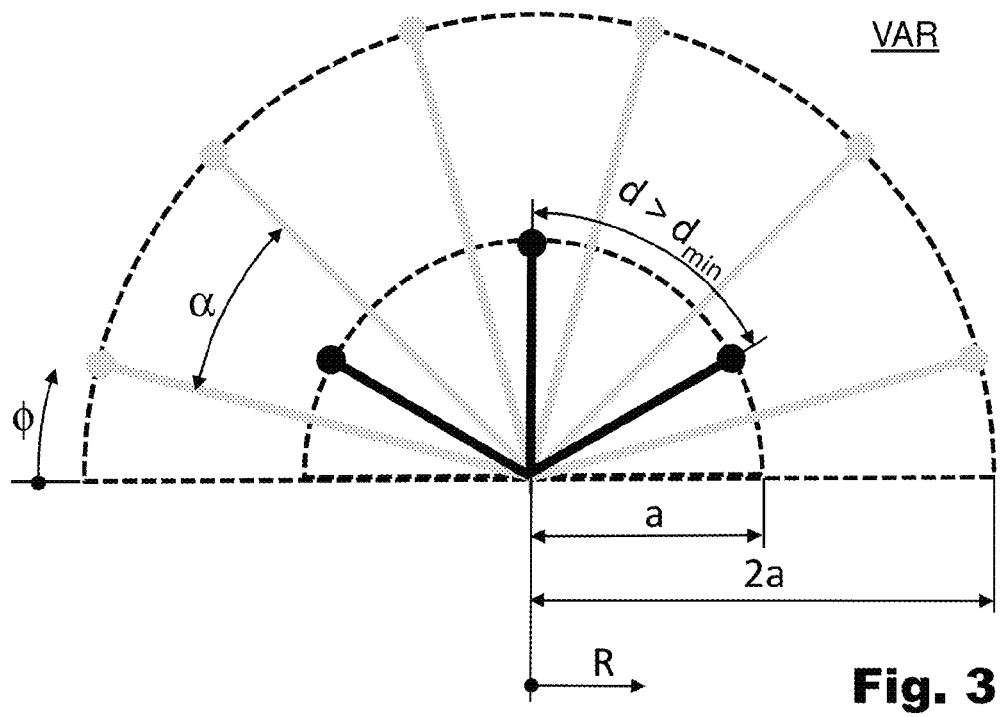
FIG. 3 is a representation of a virtual acoustic space to illustrate and derive an ideal distribution of conference participants.

In the following, the representations in FIGS. 3-5 will describe how to place the participants of conference environments 200, 300, 400 in a virtual acoustic space VAR of conference environment 100 by means of a technology known as "spacial audio". The goal is to acoustically arrange the conference participants as can be seen in the representation of the image. Therefore, one chooses the virtual acoustic space VAR as the space formed by a semicircle across from the conference table. A maximum angle of the virtual acoustic space VAR is thus set to 180°. Now it needs to be determined how the individual users or user groups are arranged from left to right. The acoustic order is to match the optical order. It is understood that this is dependent on the observer.

As an example, an ideal arrangement in conference room 1 (conference environment 100) is being assumed. The "real" participants 101, 102, 103 are sitting to the left and right of the microphone arrangement 170 in the physical room (see FIG. 2). The remaining participants are to acoustically appear at the position where no one is yet sitting, which is in the front where the video image appears. The remaining participants are now acoustically integrated into this free acoustic space.

The position of a participant on the semicircle will be $d_{min}$, the distance between the semicircles will be a; the radius of the semicircle will be calculated as:

$$R=a*k,$$

where k is defined by the number of conference participants N:

$$k=\text{Integer}(1+(N*d_{min})/(\pi*a)).$$

Due to rounding errors it may be advantageous to use the formula $$k=\text{integer}(0.9999+(N*d_{min})/(\pi*a)).$$

Assuming $d_{min}$=1 meter and a=1 meter as an example, up to 15 persons can be positioned in the semicircle since it makes sense to choose R not greater than 5.5 meter.

For simplicity, full meters are chosen below for the distances between persons $d_{min}$ and the radius units a; for a radius of 5 meters this means that up to 15 persons can be arranged in the semicircle. For more than 15 persons, the persons are arranged in different semicircles behind one another, i.e. at a distance of 1 meter for the first 3 persons, at a distance of 2 meters for the next 6 persons, at a distance of 3 meters for the next 9 persons, at a distance of 4 meters for the next 12 persons and at a distance of 5 meters for the next 15 persons. This means that with the chosen settings, up to 45 persons can be arranged.

In case $d_{min}=\pi/4$ meters and $a=\pi/4$ meters are assumed, which could be the densest possible arrangement, then a total of 7 semicircles can be occupied behind one another within the reasonable limits, $r=\pi/4 \ldots 5.5$ meters; this means that a total of 84 persons are still acoustically meaningful distributed. Of course, the procedure can still be applied beyond the radius limit of 5.5 meters, however, the balance between effort and value added seems to be preferable below this limit.

The spacial distribution of the persons in the semicircle results from the following considerations:

If a number of persons that are to be distributed on a semicircle is M and the index of the person is i, that is, the first person's index is 1 and the last person's index is M, there is an angle α between the persons:

$$\alpha=180°/M.$$

$M_{max}$ will be the maximum number of persons that are arranged in a semicircle (where $d_{min}$=1; a=1; $R_{max}$=5, then $M_{max}$=15, see calculation above). The position of the person i is then defined as follows:

In case $i<=M_{max}$ the arrangement occurs in a semicircle:

$$R=a*k,$$

with k, according to the above description $$\alpha=180°/M.$$

The height position z-coordinate is positioned in one plane with the conference participants in the room.

The position of person i:
R with an angle of $\phi(i)=\alpha/2+\alpha*(i-1)$ and Z(height value)
Example for a=1 and $d_{min}$=1:
For i>15 the rows are then to be filled as follows:
    The first 3 persons:
        r=1 m
        α=60°
        φ=30°, 90°, 120°.
    The next 6 persons:
        r=2 m
        α=30°
        φ=15°, 45°, 75°, 105°, 135°, 165°
    The next 9 persons
        r=3 m
        α=20°
        φ=10°, 30°, 50°, 70°, 90°, 110°, 130°, 150°, 170°.
The other positions result from the formula.

Figure 4:
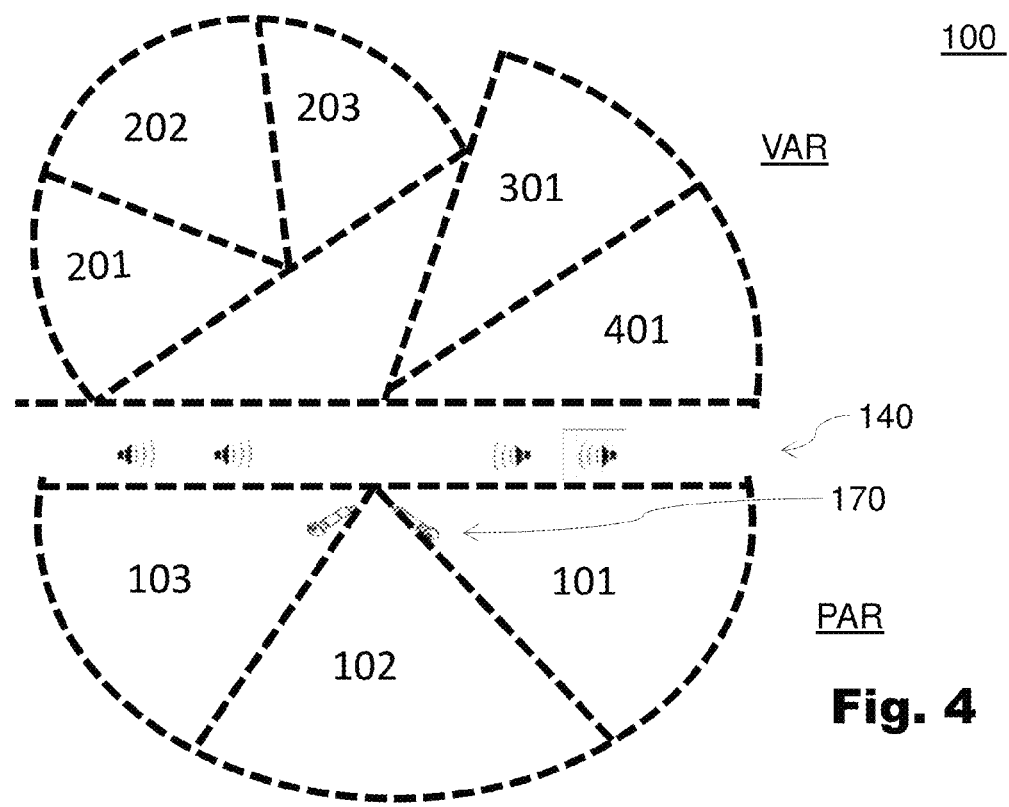
FIG. 4 is a representation of a virtual acoustic space of a conference environment with a non-ideal distribution of conference participants.
Figure 5:
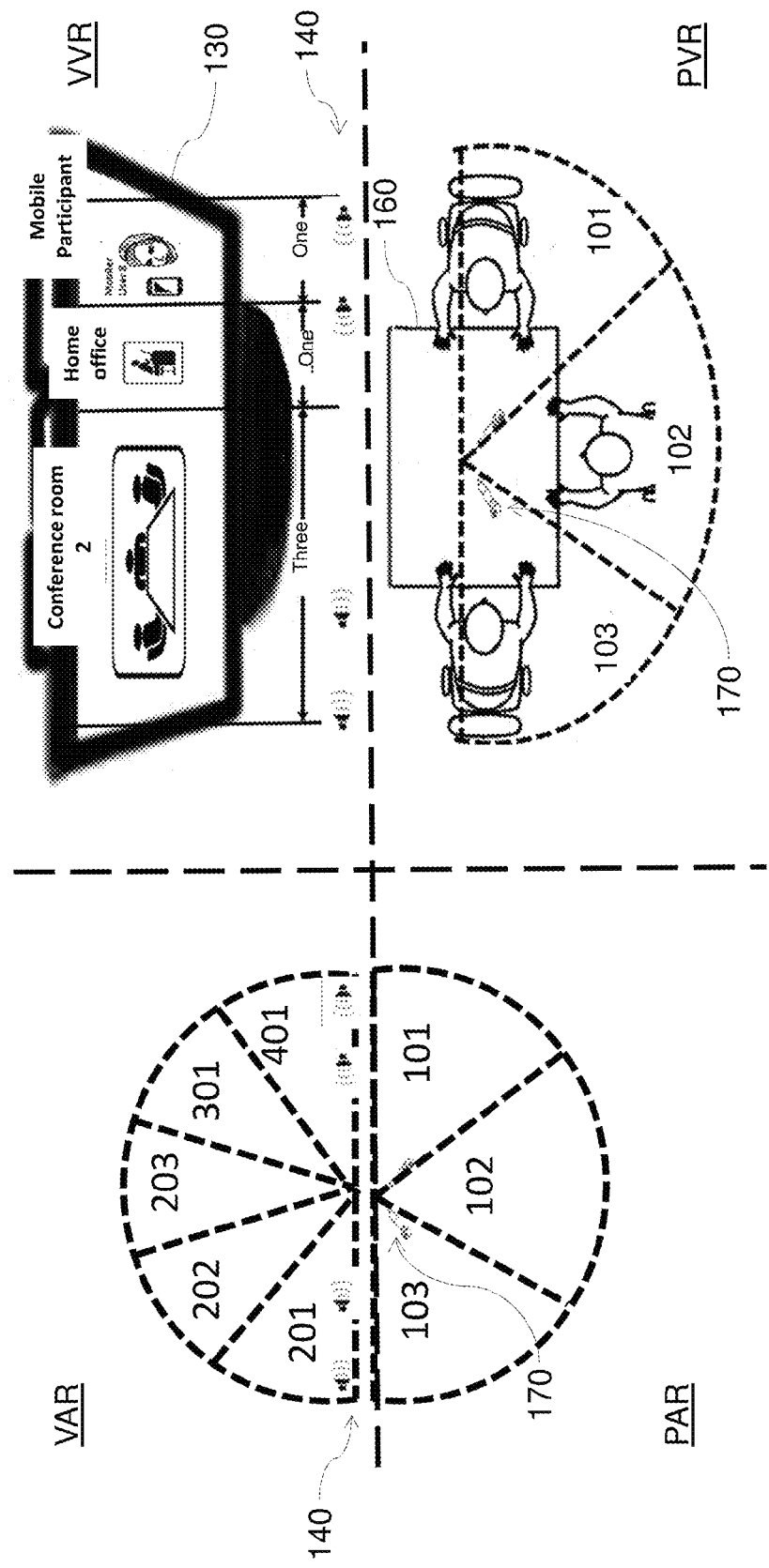
FIGS. 5 through 8 are representations of physical and virtual visual and acoustic spaces in the conference environments of FIG. 2.

FIG. 4 illustrates the non-ideal case. In the non-ideal case, the persons in the conference rooms cannot be rendered, i.e. optically/acoustically associated. Therefore, the conference room to be represented is treated as a single virtual acoustic and optical person who has a larger space requirement. The space requirement is calculated as a function of the ideal formulas of the number of persons in the conference room.

In the given example, r is calculated as in the ideal case, and the angle is half the angle made available to all persons in the conference room. Therefore, if n is the number of persons in the conference room, $$\text{angle}_{conference\ room}=\alpha_{left\ is\ already\ used}+\alpha*n/2.$$

In this case, the conference room needs to be acoustically rotated to the
    left, that is, by $(90°-0.5*\text{angle}_{conference\ room})$,
    if $\text{angle}_{conference\ room}/2<90°$,
    is rotated to the right by $(180°-0.5*\text{angle}_{conference\ room})$, if $\text{angle}_{conference\ room}/2 > 90°$, or
is not changed, if $\text{angle}_{conference\ room}/2 = 90°$.

Returning to the example with four conference environments 100, 200, 300, 400 in FIG. 2, the virtual acoustic space VAR must be created separately for each observed side, i.e. for each of conference environments 100, 200, 300, 400, which is in our example for conference environment 100 (conference room 1), conference environment 200 (conference Room 2), conference environment 300 (home office) and conference environment 400 (mobile participant).

FIGS. 5-8 each show a physical visual space PVR for one of conference environments 100, 200, 300, 400 in the lower right quadrant, where PVR corresponds to the visual impression of a physical observer, a physical acoustic space PAR in the lower left quadrant, which corresponds to the impression of a physical observer, a virtual visual space VVR in the upper right quadrant which is conveyed to the participants in the respective conference environment, and a virtual acoustic space VAR in the upper left quadrant which is conveyed to the participants in the respective conference environment.

Naturally, the acoustic sequence must be synchronized with the sequence of the video images. If one can render acoustically and one renders the video images, the distribution of persons within the space is irrelevant and they could be positioned arbitrarily. However, it makes sense to keep the persons in the conference rooms spacially together so that their interactions (facing and acoustics) will remain intelligible.

Figure 8:
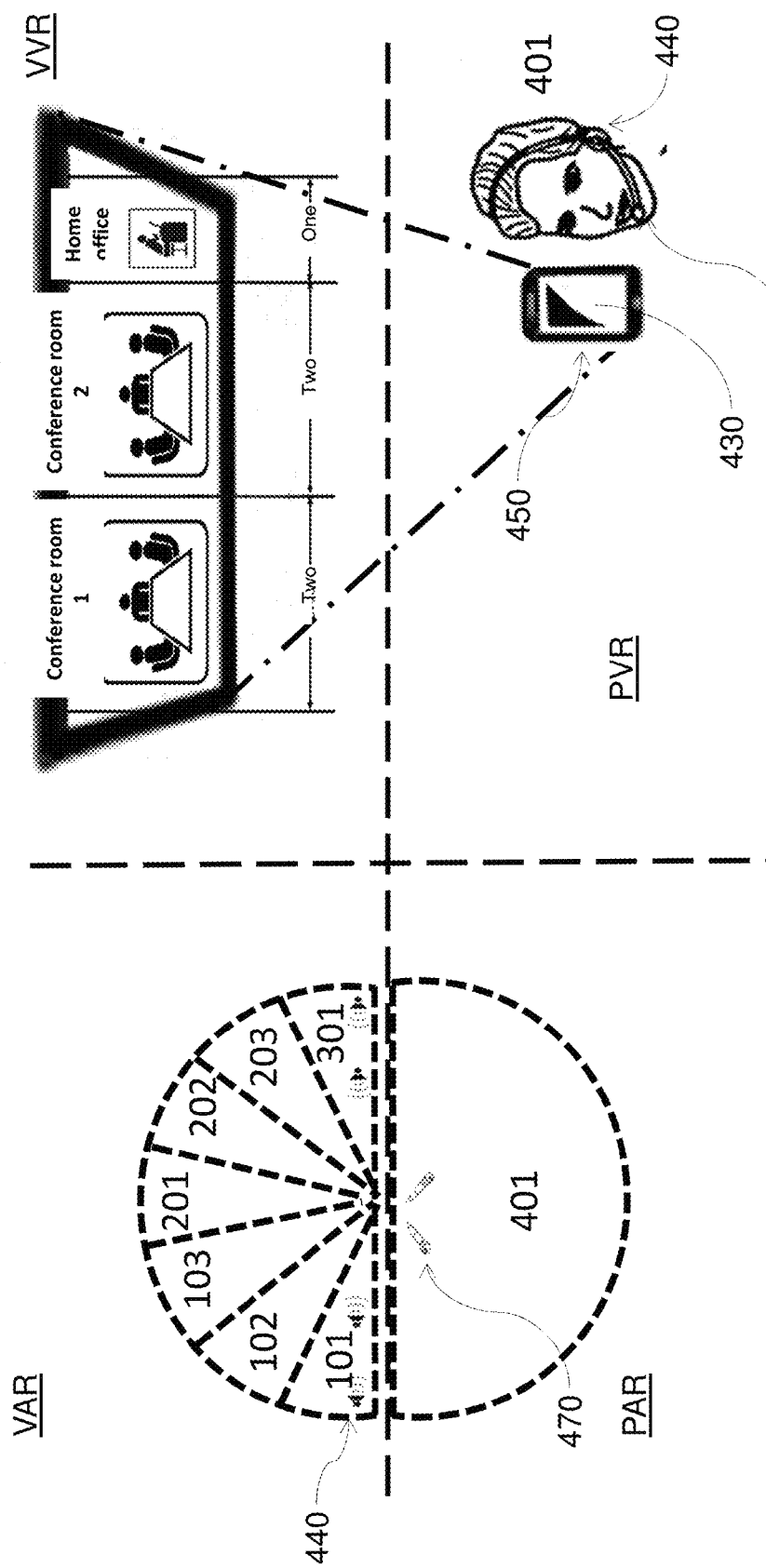
Figure 9:
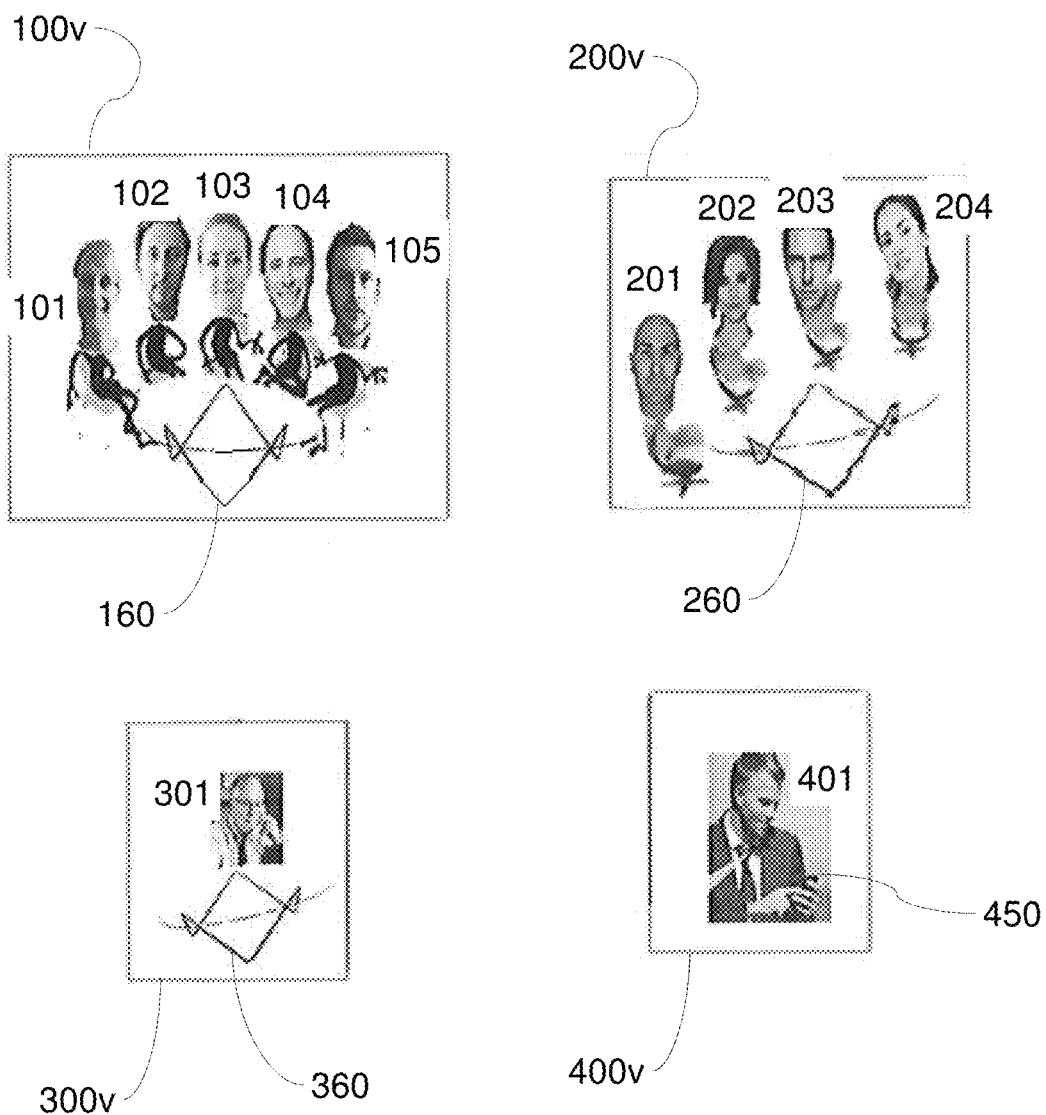
FIG. 9 is a representation of virtual images of the conference environments of FIG. 2.
Figure 10:
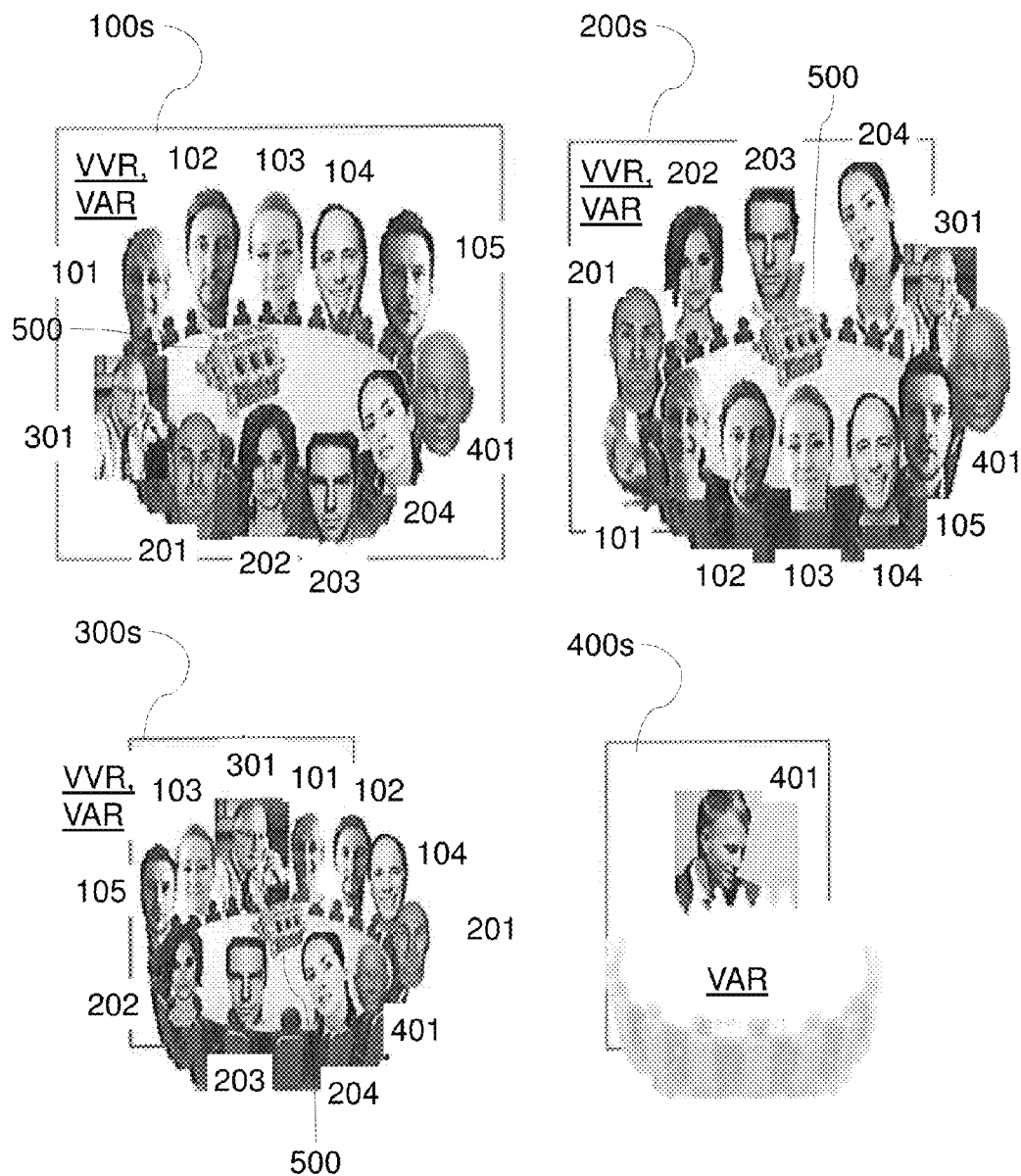
FIG. 10 is a presentation of aggregate representations of the conference environments of FIG. 2.
Figure 11:
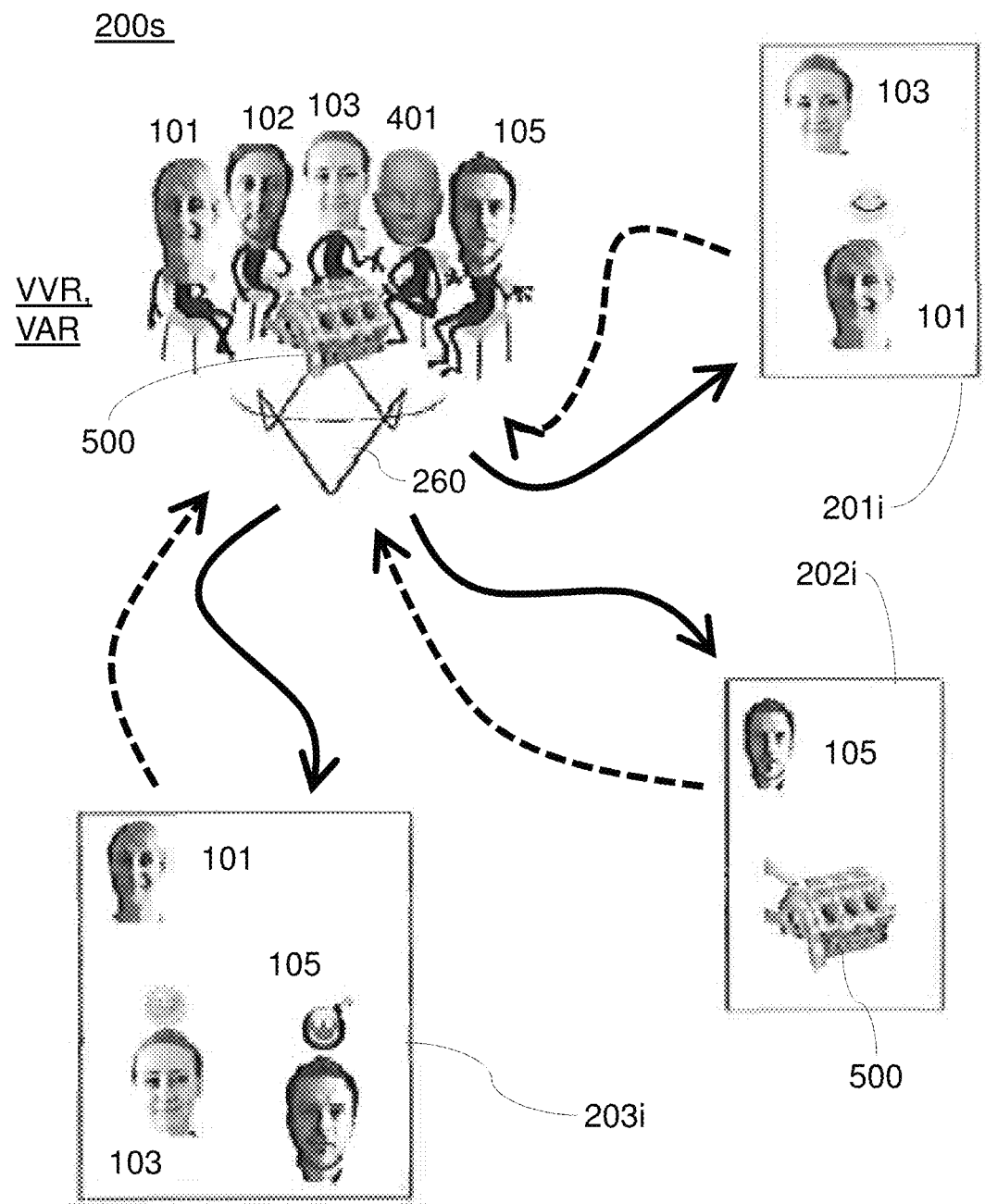
FIG. 11 is a presentation of an aggregate representation with individual views for individual participants.

With reference to FIGS. 9-11, the following is a description of a video conference and its control method according to another exemplary embodiment. The video conference of this exemplary embodiment occurs between conference environments 100, 200, 300 and 400 as described in the previous embodiment, however, conference environment 100 (conference room 1) is occupied by five participants 101, 102, 103, 104, 105, conference environment 200 (conference room 2) is occupied by four participants 201, 202, 203, 204 and conference environment 300 with one participant 301 in the form of a homeworker and conference environment 400 with one participant 401 in the form of a mobile participant correspond to the case previously described. Provided that the following Figures and the description suggest nothing to the contrary, the descriptions and representations according to FIGS. 1-8 apply just as much to this exemplary embodiment.

FIG. 9 is a schematic representation of virtual images 100$v$, 200$v$, 300$v$, 400$v$, which are initially calculated according to the control method for each conference environment.

More specifically, a virtual image 100$v$ is calculated for conference environment 100, a virtual image 200$v$ is calculated for conference environment 200, a virtual image 300$v$ is calculated for conference environment 300 and a virtual image 400$v$ is calculated for conference environment 400. The virtual image 100$v$ of conference environment 100 (conference room 1) features representations of participants 101, 102, 103, 104, 105 of conference environment 100 (conference room 1), where these participants are arranged around a reference structure (conference table) 160. The virtual image 200$v$ of conference environment 200 (conference room 1) features representations of participants 201, 202, 203, 204 of conference environment 200 (conference room 2), where these participants are arranged around a reference structure (conference table) 260. The virtual image 300$v$ of conference environment 300 (home office) features a representation of participant 301 of conference environment 300 (home office), which is arranged at a reference structure (conference table) 360. The virtual image 400$v$ of conference environment 400 (home office) features a representation of participant 401 of conference environment 400 (mobile environment), which is arranged at a reference structure (terminal device) 450.

FIG. 10 is a schematic representation of aggregate representations 100$s$, 200$s$, 300$s$, 400$s$, which are calculated according to the control method for each conference environment for provision to all participants of the respective conference environment. The aggregate representations are calculated using the virtual images of all conference environments and are adapted to the respective conference environment, in particular to the possibilities for representation of the respective conference environment.

More specifically, an aggregate representation 100$s$ is calculated for conference environment 100 (conference room 1), an aggregate representation 200$s$ is calculated for conference environment 200 (conference room 2), an aggregate representation 300$s$ is calculated for conference environment 300 (home office) and an aggregate representation 400$s$ is calculated for conference environment 400 (mobile participant). Each of the aggregate representations 100$s$, 200$s$, 300$s$, 400$s$ is calculated using all virtual images 100$v$, 200$v$, 300$v$, 400$v$.

In other words, the aggregate representations of the respective conference environments each feature representations of all participants, i.e., of participants 101, 102, 103, 104, 105 of conference environment 100 (conference room 1), of participants 201, 202, 203, 204 of conference environment 200 (conference room 2), of participant 301 of conference environment 300 (home office) and of participant 401 of conference environment 400 (mobile environment), which are arranged around a reference structure (conference table). The distribution of the participants in the aggregate representation will be selected in such a way that the participants of the respective conference environment are positioned in the center of the background of the respective aggregate representation (as a quasi "mirror" of the respective conference environment), and the participants of the other conference environments are subsequently distributed evenly around the reference structure. This means that, in the aggregate representation 100$s$ for conference environment 100 (conference room 1), participants 101, 102, 103, 104, 105 of the respective conference environment 100 (conference room 1) are positioned centered in the background of aggregate representation 100$s$, and the remaining participants are subsequently distributed to the right and left of the reference structure. Furthermore, in the aggregate representation 200$s$ for conference environment 200 (conference room 2), participants 201, 202, 203, 204 of the respective conference environment 200 (conference room 1) are positioned in the center of the background of aggregate representation 200$s$, and the remaining participants are subsequently distributed to the right and left of the reference structure. Furthermore, in the aggregate representation 300$s$ for conference environment 300 (home office), participant 301 of the respective conference environment 300 (home office) is positioned in the center of the background of aggregate representation 300$s$, and the remaining participants are subsequently distributed to the right and left of the reference structure. Finally, in the aggregate representation 400$s$ for conference environment 400 (mobile environment), participant 401 of the respective conference environment 400 (mobile environment) is positioned in the center of the background of aggregate representation 400$s$, and the remaining participants are subsequently distributed to the right and left of the reference structure.

Each of the aggregate representations 100$s$, 200$s$, 300$s$, 400$s$ features a visual part in the form of a virtual visual space VVR and an acoustic part in the form of a virtual acoustic space VAR within the meaning of the description of FIGS. 5-8.

Depending on the reproduction possibilities of the respective conference environment, the virtual visual space VVR and the virtual acoustic space VVR are processed and provided to the participant(s). Therefore, aggregate representations 100s, 200s, 300s provide for a visual representation of all participants within the virtual visual space VVR for conference environment 100 (conference room 1), conference environment 200 (conference room 2) and conference environment 300 (home office), and the positions of the participants within the virtual acoustic space VAR are adjusted to the positions within the virtual visual space VVR in such a way that the respective image reproduction device 130, 230, 330 (see FIGS. 1, 2, 5-8) and the respective sound reproduction device 140, 240, 340 (at that very place) create a naturally appearing virtual conference reality in which the visual and acoustic position of each participant match at least substantially the participants that are actually located in the respective conference room.

In contrast, aggregate representation 400s for conference environment 400 (mobile environment) according to the representation in FIG. 10 features only the virtual acoustic space VVR, which is adjusted to the reproduction possibilities of a headset (oftentimes with only two channels) but does not feature a virtual visual space when terminal device 450 of (mobile) participant 401 has no adequate possibility for visual representation, as it is assumed in this example (in modification of the representation in FIGS. 2, 8). In this case, there is no synchronicity between acoustic and visual impression (since the latter is not provided), yet, regarding (mobile) participant 401, the advantage here is that the conference participants can be located and separated within the stereophonic room. Of course, if terminal device 450 of (mobile) participant 401 has an adequate visual representation possibility available as shown in FIG. 8, it is also possible to provide the terminal device with a corresponding virtual visual space VVR.

It is also important to note that (mobile) participant 401 is shown as an avatar in aggregate representations 100s, 200s, 300s in FIG. 10; this hints at a case in which (mobile) terminal device 450 of conference environment 400 (mobile environment) features no image recording apparatus and therefore provides no image representation of participant 401. Also, the representation of participant 401 in aggregate representation 400s should only be considered a reference point für the virtual acoustic space VAR; it is not intended here to visually present participant 401 on (mobile) terminal device 450.

To avoid echo effects and thereby induced confusion it is advantageously provided that the participants of the respective conference environment are hidden within the virtual acoustic space VAR of aggregate representations 100s, 200s, 300s, 400s, even if they are included in the associated virtual visual space VVR. It is also possible to hide the participants of the respective conference environment from the respective virtual visual space VVR, as shown in FIGS. 5-8.

In addition to the participants, the aggregate representations can feature a symbolic representation of an object 500, as shown in aggregate representations 100s, 200s, 300s. Object 500 is, for example, a file or an application that can be retrieved by a participant and displayed in a separate window or run.

FIG. 11 is a schematic representation of aggregate view 200s according to a modification of the exemplary embodiment, which is calculated according to the control method for conference environment 200 (conference room 2) to be provided to all participants of the respective conference environment 200, as well as several individual views 201i, 202i, 203i, that are calculated according to the control method for individual participants 201, 202, 203 of the respective conference environment 200 to be provided to the individual conference participants 201, 202, 203. The individual views 201i, 202i, 203i are calculated using aggregate representation 200s of the respective conference environment 200, which participants 201, 202, 203 belong to, and are adjusted to participants 201, 202, 203, and in particular to their specifications and current requirements as well as the possibilities for representation of their individual terminal devices. The individual requirements of a participant can be communicated to the communication server by voice or text.

The aggregate view 200s shown in FIG. 11 differs from the aggregate view 200s shown in FIG. 10 therein that only participants 101, 102, 103, 105 of conference environment 100, the avatar of participant 401 and object 500 are arranged at reference structure 260 and form the virtual visual space VVR and the virtual acoustic space VAR according to the above description. In other words, in the variant shown in FIG. 11, the participants of the respective conference environment 200 are not reproduced in the aggregate representation 200s. Moreover, compared to the conferencing situation shown in FIG. 10, it can be assumed that in the conferencing situation shown in FIG. 11, participant 104 has (temporarily) left conference room 1 and homeworker 301 has logged out of the conference.

Individual view 201i, which is calculated to be provided on the personal terminal device of participant 201, features participants 101 and 103 according to the representation in FIG. 11. Individual view 202i, which is calculated to be provided on the personal terminal device of participant 202, features participant 105 and object 500. Individual view 203i, which is calculated to be provided on the personal terminal device of participant 203, features participants 101, 103, 105. The individual views 201i, 202i, 203i can feature a zoom functionality with regard to the displayed participants. Some of the participants shown in the individual views 201i, 202i, 203i are mapped to respective symbols, so-called emoticons. It is also possible to request and show context information of any kind, such as CVs, contact information etc. about the respective participants via a back-end service, possibly in other separate windows (separately opening windows). Such context data can be derived, for example, from the company data or from publicly available data or databases or from the real video conference (emoticons from the speech or from the image), resulting in a specific context for one or more persons in the separate view that is generated. As an example, common analysis technologies can be applied for this purpose. Arrows between aggregate representation 200s and the individual views 201i, 202i, 203i symbolize a control functionality and a feedback functionality that can include, for example, that the reactions of each conference participant are identified and mapped to the talking or active participant (e.g., as in the case of screen sharing) as the feedback. It is also conceivable that the real video is saved with sound and the talking or active person is mapped as feedback. The mapping of the context to participants is interpreted as feedback for the currently acting participants in the video conference. Objections and contributions from participants on issues and actions of the acting participants can be interpreted as feedback. No reaction can also be registered as a feedback. Thus, there is a feedback history for the acting participants.

The additional information that may be assigned to the conference participants as feedback provides a control option for the active persons and can also maintain the satisfaction with and the efficiency of the conference. The spacial-acoustic positioning of the participants can also improve the intelligibility and can help allocate what is said to the respective speaker.

The method described above is preferably controlled by a conference server (see conference server 2 in FIG. 1). Individual steps can also be carried out for downstream devices, such as a local conferencing unit (see local conferencing unit 120 in FIG. 1), image or sound reproduction devices (see 130, 140 in FIG. 1) or individual terminal devices (see 150 in FIG. 1, 350 in FIG. 7, 450 in FIG. 8).

A new virtual overall view of the conference can be provided, which makes available all the functionalities of the real conference (in which all participants are in a same physical room). In addition, by selecting a virtual image, it is possible to access back-end services containing context information on the respective participant, e.g. statements on the specific work history of the participant, subjective experiences with the participant in the past, personal notes from the participant's contact data, and finally also emotional attributes that the conference participant has personally attributed to this participant in the past. These pieces of information and assessments can also be modified, revised or extended during the conference. This data is highly individual and subjective, and therefore must not be made available to other participants of the conference. The disclosed method can effectively combine a virtual conference while also allowing for individual partial views. This can be accomplished by extending the real conference environment by the virtual space or by means of providing the participant with the individual space only. Each participant can always be provided with at least the image information or the video stream on his personal mobile terminal device.

According to a present preferred embodiment, the conferencing unit (or central conference server) controls not only the common view of the conference (video/audio), but also provides for a separate logical unit per participant/conference environment. This individual conferencing unit can be controlled individually: zooming, choosing persons, showing context, mood, personal relationship. Each conference participant receives a private view of a virtual conference room. All participants and conference rooms are virtually distributed in a room with the help of technology, such as is available, for example, under the name of "ViViconf". Using a technology such as technology that is accessible, for example, under the name "Spacial Audio", the acoustic position is synchronized with the optical position.

Participants who sit together in a conference room have a common virtual space with acoustic mapping of all conference participants not residing in the room. The individual virtual conference room, in this case without acoustic synchronization, can be displayed respectively on the personal mobile terminal device (e.g. tablet, smartphone or the like). This is desirable in order to display the private context of also the participants residing within the room. Alternatively, as an example, a laptop or monitor, used by the individual participant, with a limited viewing angle, that can, for example, be limited by means of applying an appropriate foil to the surface of the laptop or monitor. Due to the limited viewing angle it can be avoided that bystanders of the individual participant can see the presented content of the laptop or monitor.

To minimize the resource and performance needs, it may be provided that the images within the virtual conference room are always sorted in the same way, e.g., from left to right: conference room 1, conference room 1, . . . , individual participant 1, individual participant 2, . . . . Thus, the virtual conference room for each "view" can be easily generated and calculated by optically and acoustically subtracting the individual or the conference room. This creates a possibility to perform the acoustical and optical placement only once. The conference participants are shown equally distributed within the conference room. This is beneficial in order to gain a differentiated spacial position within the "Spacial Audio".

Thus, the conferencing unit creates multiple "views" of the video conference:

For each site (conference environment), it processes the received media data (virtual images) of the different participant and room cameras and microphones to a virtual conference room (aggregate representation) of the respective conference environment. In addition to the actually present participants in the respective room, each participant is explicitly placed and his/her voice is placed within the same position so that the voice comes from the same direction as the picture. A real sense of space arises because different persons or conference environments are arranged structurally within the space.

Participants who are sitting in a conference room, receive—by means of the additive individual video image of the virtual conference on a personal terminal device—the possibility to access via simple mouse click, touching the screen or similar, the context of the participants that are sitting in a conference room.

In the individual view the conferencing unit assigns the identity to the image. Thus, one can simply assign the respective context data to the conference participants.

With the help of the available media data, the conferencing unit creates selectable modules that each participant can individually select for his/her own private view (individual view), e.g., the participant in the home office, or the participant who is just presenting. Depending on the instruction indicated in the private profile (which can be changed at any time), additional metadata are being integrated from the conferencing unit in the private view (Individual view). These originate either from the private contact data or from a variety of publicly available information, which are complemented by the conferencing unit or an upstream back-end server incrementally, even during the conference.

The features of the method described in relation to the embodiments presented, e.g., displaying the individual virtual conference room without acoustic synchronization, respectively only on the personal mobile terminal device (e.g., tablet, smartphone, or the like) of an individual participant of the conference can also be present in other embodiments of the invention, e.g. the usage of a laptop or monitor with a limited viewing angle by the same or a different individual participant, except when indicated otherwise or prohibited for technical reasons.

LIST OF REFERENCE SIGNS AND SYMBOLS

1 Conferencing system
2 Conference server
3 Network connection
4 Intranet
100 Conference environment (conference room 1)
100v Virtual image (of conference room 1)
100s Aggregate representation (for conference room 1)
101, . . . , 105 Participant
120 Local conferencing unit
125 Network connection
130 Image reproduction unit
135 Wire connection
140 Sound reproduction unit
145 Wire connection 150 Terminal device
155 Wireless connection
160 Conference table/reference structure
170 Microphone arrangement
200 Conference environment (conference room 2)
200v Virtual image (of conference room 2)
200s Aggregate representation (for conference room 2)
201, . . . , 204 Participant
201i, . . . , 203i Individual view for participant 201, . . . , 203
230 Image reproduction unit
240 Sound reproduction unit
260 Conference table/reference structure
270 Microphone arrangement
300 Conference environment (home office)
300v Virtual image (of home office)
300s Aggregate representation (for home office)
301 Participant (homeworker)
320 Local conferencing unit
330 Image reproduction unit
340 Sound reproduction unit
350 Terminal device
360 Desk table/reference structure
370 Microphone arrangement
380 Camera arrangement
400 Conference environment (mobile environment)
400v Virtual image (of mobile environment)
400s Aggregate representation (for mobile participant)
401 (Mobile) participant
420 Local conferencing unit
430 Image reproduction unit
440 Sound reproduction unit
450 Terminal device
470 Microphone arrangement
a Semicircle distance
d Position distance
PAR Physical acoustic space
PVR Physical visual space
R Radius
VAR Virtual acoustic space
VVR Virtual visual space
α Angle distance
φ Position angle
The above list is an integral part of the description.

What is claimed is:

1. A method for conducting a conference among sets of conference participants, one set of conference participants being at a first conference environment, at least one other set of conference participants being at another conference environment, the conference participants being connected by a communication system comprised of at least one conference server, at least one image reproduction unit at each conference environment on which images corresponding to at least some of the conference participants are displayed and at least one microphone at each conference environment, wherein the method comprises:
  a) calculating respective virtual images of a majority of the conference environments, each virtual image containing at least one image corresponding to at least one conference participant who is present at that conference environment;
  b) calculating an aggregate representation of the virtual images of all conference environments;
  c) displaying the aggregate representation on at least one image reproduction unit;
  d) receiving and processing individual requirements of an individual participant,
  e) after the receiving and processing of the individual requirements of the individual participant, calculating an individual representation for an individual conference participant based upon the aggregate representation of the respective conference environment of which the individual participant is a part and based on the individual requirements of the individual participant, wherein the individual requirements encompass attenuating a listening level for at least one conference participant; and
  f) providing the individual participant with the individual representation while simultaneously providing to that individual the aggregate representation.

2. The method as in claim 1 wherein steps a) through f) are performed by the at least one conference server.

3. The method as in claim 1 wherein the communication system also comprises a local conferencing unit which is assigned to the respective conference environment of which the individual participant is a part and which performs steps b) through f).

4. The method of claim 3 wherein the local conferencing unit receives the virtual images of all other conference environments before performing step b).

5. The method as in claim 3 wherein step e) is preceded by a step of receiving the aggregate representation for the respective local conferencing unit.

6. The method as in claim 1, wherein the individual requirements encompass at least one requirement from the group consisting of spatial arrangement of the conference participants; removing, adding, resizing one or more participants and/or objects; placing one or more participants in a separate representation; representing additional information selected from the group consisting of metadata, context data, moods, personal relationship data, professional relationship data, and private contact details for at least one participants; and emphasizing a listening level for at least one conference participant.

7. The method of claim 1 wherein the requirements of the individual participant are communicated via voice input.

8. The method of claim 1 wherein the individual representation is provided on a mobile terminal device.

9. The method as in claim 1 wherein the conference participants are optically equally distributed in the aggregate representation.

10. The method as in claim 1 wherein the conference participants are acoustically equally distributed in the aggregate representation.

11. A communication system connecting a plurality of conference environments comprised of at least one conference server, at least one image reproduction unit at each conference environment on which images corresponding to at least some conference participants are displayed and at least one microphone at each conference environment, the at least one conference server containing a processor and a non-transitory memory containing a program which causes the communication system to perform a method comprising:
  a) calculating respective virtual images of a majority of the conference environments, each virtual image containing at least one image corresponding to at least one conference participant who is present at that conference environment;
  b) calculating an aggregate representation of the virtual images of all conference environments;
  c) displaying the aggregate representation on at least one image reproduction unit;
  d) receiving and processing individual requirements of an individual participant e) after the receiving and processing of the individual requirements of the individual participant, calculating an individual representation for an individual conference participant based upon the aggregate representation of the respective conference environment of which the individual participant is a part and based on the individual requirements of the individual participant, wherein the individual requirements encompass attenuating a listening level for at least one conference participant; and f) providing the individual participant with the individual representation while simultaneously providing to that individual the aggregate representation.

12. The communication system of claim 11 also comprising a local conferencing unit connected to the at least one conference server and which is assigned to the respective conference environment of which the individual participant is a part.

13. A non-transitory computer readable medium having a program defining a method that is executable by a conference server in a communication system for conducting a conference among sets of conference participants, one set of conference participants being at a first conference environment, at least one other set of conference participants being at another conference environment, the conference participants being connected by the communication system, the communication system comprised of at least one conference server, at least one image reproduction unit at each conference environment on which images corresponding to at least some of the conference participants are displayed and at least one microphone at each conference environment, wherein the method comprises:

a) calculating respective virtual images of a majority of the conference environments, each virtual image containing at least one image corresponding to at least one conference participant who is present at that conference environment;

b) calculating an aggregate representation of the virtual images of all conference environments;

c) displaying the aggregate representation on at least one image reproduction unit;

d) receiving and processing individual requirements of an individual participant e) after the receiving and processing of the individual requirements of the individual participant, calculating an individual representation for an individual conference participant based upon the aggregate representation of the respective conference environment of which the individual participant is a part and based on the individual requirements of the individual participant, wherein the individual requirements encompass attenuating a listening level for at least one conference participant; and f) providing the individual participant with the individual representation while simultaneously providing to that individual the aggregate representation.

* * * * *